US008693437B2

(12) United States Patent
Wu (10) Patent No.: US 8,693,437 B2
(45) Date of Patent: Apr. 8, 2014

(54) METHOD OF CONFIGURING SECONDARY CELLS AND RELATED COMMUNICATION DEVICE

(75) Inventor: Chih-Hsiang Wu, Taoyuan County (TW)

(73) Assignee: HTC Corporation, Taoyuan, Taoyuan County (TW)

( * ) Notice: Subject to any disclaimer, the term of this patent is extended or adjusted under 35 U.S.C. 154(b) by 111 days.

(21) Appl. No.: 13/231,927

(22) Filed: Sep. 13, 2011

(65) Prior Publication Data

US 2012/0063421 A1 Mar. 15, 2012

Related U.S. Application Data

(60) Provisional application No. 61/382,495, filed on Sep. 14, 2010.

(51) Int. Cl.
*H04W 4/00* (2009.01)
*H04W 36/28* (2009.01)

(52) U.S. Cl.
USPC .......................................... 370/331; 455/439

(58) Field of Classification Search
USPC ................... 370/328, 332, 331; 455/436, 439
See application file for complete search history.

(56) References Cited

U.S. PATENT DOCUMENTS

| 2009/0270103 | A1* | 10/2009 | Pani et al. | 455/436 |
|---|---|---|---|---|
| 2010/0222059 | A1* | 9/2010 | Pani et al. | 455/436 |
| 2011/0159903 | A1* | 6/2011 | Yuk et al. | 455/507 |
| 2011/0269453 | A1* | 11/2011 | Ranta-Aho et al. | 455/424 |

FOREIGN PATENT DOCUMENTS

| KR | 1020090073443 A | 7/2009 |
|---|---|---|
| KR | 1020100084907 A | 7/2010 |
| WO | 2009084864 A1 | 7/2009 |

OTHER PUBLICATIONS

Fujitsu, HO and CC handling, May 14, 2010, 3GPP TSG-RAN WG2 Meeting #70, R2-103078.*
European patent application No. 11007500.9, European Search Report mailing date: Mar. 5, 2012.
Rapporteur (Samsung), "Introduction of Carrier Aggregation", 3GPP TSG-RAN WG2 Meeting #71, R2-104516, Madrid, Spain, Aug. 23-27, 2010, XP050451878, p. 1-72.
3GPP TS 36.300 V10.0.0 (Jun. 2010), "3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 10)", XP050441905, p. 1-183.
3GPP TSG-RAN WG2 Meeting #71 R2-104991 Madrid, Spain, Aug. 23-27, 2010 "Introduction of Carrier Aggregation", Change Request 36.331 CR CRNum rev—Current version: 9.3.0, Aug. 2010.

(Continued)

*Primary Examiner* — Hoon J Chung
*Assistant Examiner* — Yaotang Wang
(74) *Attorney, Agent, or Firm* — Winston Hsu; Scott Margo (57) ABSTRACT

A method of handling at least one secondary cell of a mobile device in a wireless communication system is disclosed. The mobile device is managed by a first network of the wireless communication system. The method comprises releasing the at least one secondary cell, after receiving a handover command from the first network, wherein the handover command indicates the mobile device to hand over from the first network to a second network of the wireless communication system; wherein the second network conforms to a 3GPP standard with a version equal to or earlier than the 3GPP Rel-9, and the first network conforms to the 3GPP standard with a version equal to or later than the 3GPP Rel-10.

3 Claims, 6 Drawing Sheets

(56) References Cited

OTHER PUBLICATIONS

3GPP TSG RAN WG2 #71 R2-10xxxx Aug. 23-27, 2010, Madrid, Spain Date:Aug. 27, 2010 Source: Chairman a.o. Object:Proposed Agenda, Aug. 2010.
3GPP TS 36.331 V9.3.0 (Jun. 2010) Technical Specification 3rd Generation Partnership Project; Technical Specification Group Radio Access Network; Evolved Universal Terrestrial Radio Access (E-UTRA); Radio Resource Control (RRC); Protocol specification (Release 9).
3GPP TS 25.413 V9.3.0 (Jun. 2010) Technical Specification 3rd Generation Partnership Project; Technical Specification Group Radio Access Network; UTRAN Iu interface Radio Access Network Application Part (RANAP) signalling (Release 9).
Ericsson, St-Ericsson, "Comparison of solutions for HO to legacy eNBs", 3GPP TSG-RAN WG2 #68bis, Tdoc R2-100200, Jan. 18-22, 2010, p. 1-2, Valencia, Spain.
Office Action mailed on Dec. 4, 2012 for the Japanese Application No. 2011-201177, filed Sep. 14, 2011, p. 1-2.
European patent application No. 11007500.9, European Search Report mailing date: Nov. 30, 2011.
LG Electronics Inc., "Serving Cell Handling in CA", 3GPP TSG-RAN WG2 #67bis, R2-095693, Oct. 12-16, 2009, Miyazaki, Japan, XP050390201, p. 1-4.
Fujitsu, "HO and CC handling", 3GPP TSG-RAN WG2 Meeting #70, R2-103078, May 10-14, 2010, Montreal, Canada, XP050423244, p. 1-2.
Alcatel-Lucent, "Full configuration solution for eNB release handling", 3GPP TSG-RAN WG2 Meeting #69, R2-101883, Feb. 22-26, 2010, San Francisco, USA, XP050422230, p. 1-16.
Qualcomm et al., "Performance Measurements for Intra-frequency Handover Monitoring", 3GPP TSG-SA5 (Telecom Management) Meeting SA5#61, Oct. 13-17, 2008, Dalian, China, S5-081901, revision of S5-081723.
Office Action mailed on Jan. 25, 2013 for the Korean Application No. 10-2011-0092678, filed Sep. 14, 2011, pp. 1-4.

\* cited by examiner

METHOD OF CONFIGURING SECONDARY CELLS AND RELATED COMMUNICATION DEVICE

CROSS REFERENCE TO RELATED APPLICATIONS

This application claims the benefit of U.S. Provisional Application No. 61/382,495, filed on Sep. 14, 2010 and entitled "Method and Apparatus for configuring secondary cells in a wireless communication system", the contents of which are incorporated herein in their entirety.

BACKGROUND OF THE INVENTION

1. Field of the Invention

The present invention relates to a method used in a wireless communication system and related communication device, and more particularly, to a method of configuring secondary cells and related communication device.

2. Description of the Prior Art

The 3rd Generation Partnership Project (3GPP) has developed a universal mobile telecommunications system (UMTS) which adopts a wideband code division multiple access (WCDMA) as a wireless air interface. In the UMTS, a radio access network known as a universal terrestrial radio access network (UTRAN) includes multiple Node-Bs (NBs) for communicating with multiple user equipments (UEs). The WCDMA provides high frequency spectrum utilization, universal coverage, and high-speed multimedia data transmission which are beneficial for the UEs and the NBs of the UMTS. Furthermore, a long-term evolution (LTE) system supporting the 3GPP Rel-8 standard and/or the 3GPP Rel-9 standard is now being developed by the 3GPP as a successor of the UMTS, to further enhance performance of the UMTS to satisfy users' increasing needs. The LTE system includes a new radio interface and radio network architecture that provides a high data rate, low latency, packet optimization, and improved system capacity and coverage. In the LTE system, a radio access network known as an evolved UTRAN (E-UTRAN) includes multiple evolved NBs (eNBs) for communicating with multiple UEs, and communicates with a core network including a mobility management entity (MME), serving gateway, etc for NAS (Non Access Stratum) control.

The main purpose of a handover is to maintain an ongoing connection which may be used for handling voice or data while a UE continuously moves. Since the UE may occasionally moves from the coverage of a source eNB to the coverage of neighboring eNBs, the ongoing connection must be transferred correspondingly to maintain the ongoing connection. Based on the measurement reports provided by the UE which include information of signal quality related to the source eNB and the neighboring eNBs, the source eNB determines whether the handover should be initiated. The source eNB performs the handover by sending the UE radio resource control (RRC) context information to the neighboring eNBs and receiving corresponding radio resource configurations from the neighboring eNBs. According to the radio resource configurations, the source eNB transmits a handover command to the UE, and the UE performs the handover including a radio access channel (RACH) procedure to a target eNB according to the handover command. Please note that, there is no dedicated handover command in the LTE system, a RRC-ConnectionReconfiguration message including a mobility-Controlinfo is treated as the handover command to trigger the UE to perform the handover.

A LTE-advanced (LTE-A) system, as its name implies, is an evolution of the LTE system. The LTE-A system targets faster switching between power states, improves performance at the coverage edge of an eNB, and includes advanced techniques, such as carrier aggregation (CA), coordinated multipoint transmission/reception (COMP), UL multiple-input multiple-output (MIMO), etc. For a UE and an eNB to communicate with each other in the LTE-A system, the UE and the eNB must support standards developed for the LTE-A system, such as the 3GPP Rel-10 standard or later versions.

For bandwidth extension, a carrier aggregation (CA) is introduced to the LTE-A system by which two or more component carriers are aggregated to achieve a wider-band transmission. Accordingly, the LTE-A system can support a wider bandwidth up to 100 MHz by aggregating a maximum number of 5 component carriers, where bandwidth of each component carrier is 20 MHz and is backward compatible with 3GPP Rel-8. The LTE-A system supports the CA for both continuous and non-continuous component carriers with each component carrier limited to a maximum of 110 resource blocks. The CA increases bandwidth flexibility by aggregating the non-continuous component carriers.

When the UE is configured with the CA, the UE is allowed to receive and transmit data on one or multiple component carriers to increase the data rate. In the LTE-A system, it is possible for the eNB to configure the UE different numbers of UL and DL component carriers which depend on UL and DL aggregation capabilities, respectively. Moreover, the component carriers configured to the UE necessarily consists of one DL primary component carrier (PCC) and one UL primary component carrier. Component carriers other than the primary component carriers are named UL or DL secondary component carriers (SCCs). The numbers of UL and DL secondary component carriers are arbitrary, and are related to the UE capability and available radio resources. Further, a cell operating on the primary component carrier is termed a primary cell, and a cell operating on the secondary component carrier is termed a secondary cell. Therefore, when the UE is configured with multiple component carriers, it implies that the UE is configured with multiple cells corresponding to the multiple component carriers.

On the other hand, a handover may occur between different radio access technologies, i.e., an inter-RAT (radio access technology) handover. For example, the UE may be handed over from an eNB of the LTE system to an eNB of the LTE-A system or the UMTS, and vice versa. In this situation, functional differences between the different radio access technologies should be taken into consideration when the inter-RAT handover happens. Further, when the UE is handed over from the eNB of the LTE-A system to the eNB of the LTE system or the UMTS (or an even earlier system), it is not known how to deal with the secondary cells, since the eNB of the LTE system or the UMTS does not support multiple component carriers and thus multiple cells. Besides, when the UE is handed over from the eNB of the LTE system or the UMTS to the eNB of the LTE-A system, the eNB of the LTE-A system cannot allocate the multiple component carriers to the UE immediately, since the eNB of the LTE system or the UMTS does not support the CA and can not provide related measurement results to the eNB of the LTE-A system. In other words, the eNBs and the UE may not operate normally and efficiently, when the inter-RAT handover happens. Therefore, signalings and protocols related to the inter-RAT handover must be designed such that the UE and the eNB can operate normally, and achieve their best performance by using the resources (e.g. component carriers and/or power) efficiently.

SUMMARY OF THE INVENTION

The present invention therefore provides a method and related communication device for configuring secondary cells to solve the abovementioned problems.

A method of handling at least one secondary cell of a mobile device in a wireless communication system is disclosed. The mobile device is managed by a first network of the wireless communication system. The method comprises releasing the at least one secondary cell, after receiving a handover command from the first network, wherein the handover command indicates the mobile device to hand over from the first network to a second network of the wireless communication system; wherein the second network conforms to a 3GPP standard with a version equal to or earlier than the 3GPP Rel-9, and the first network conforms to the 3GPP standard with a version equal to or later than the 3GPP Rel-10.

A method of handling an inter-RAT (radio access technology) handover of a first network of a wireless communication system, for handling the inter-RAT handover from the first network to a second network of the wireless communication system is disclosed. The method comprises forwarding a plurality of measurement results to the second network, wherein the plurality of measurement results comprise a best cell for a first component carrier and at least one available cell for a second component carrier.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
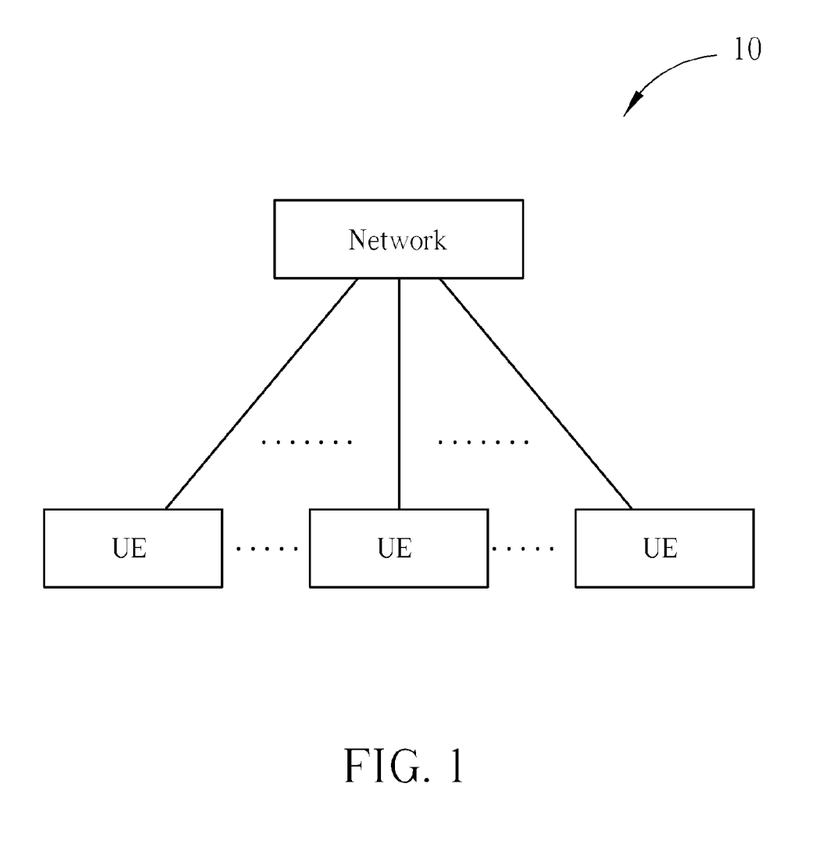
FIG. 1 is a schematic diagram of an exemplary wireless communication system according to the present invention.

Please refer to FIG. 1, which is a schematic diagram of a wireless communication system 10 according to an example of the present invention. The wireless communication system 10, such as a universal mobile telecommunications system (UMTS), a long term evolution (LTE) system or a LTE-Advanced (LTE-A) system supporting a carrier aggregation (CA), is briefly composed of a network and a plurality of user equipments (UEs). In FIG. 1, the network and the UEs are simply utilized for illustrating the structure of the wireless communication system 10. Practically, the network can be referred as to a UTRAN comprising a plurality of Node-Bs (NBs) in the UMTS or an evolved universal terrestrial radio access network (E-UTRAN) comprising a plurality of evolved NBs (eNBs) in the LTE system. Further, the network can be referred as to an E-UTRAN comprising a plurality of eNBs and relays in the LTE-A system. The UEs can be mobile devices such as mobile phones, laptops, tablet computers, electronic books, and portable computer systems. Besides, the network and a UE can be seen as a transmitter or a receiver according to transmission direction, e.g., for an uplink (UL), the UE is the transmitter and the network is the receiver, and for a downlink (DL), the network is the transmitter and the UE is the receiver.

Figure 2:
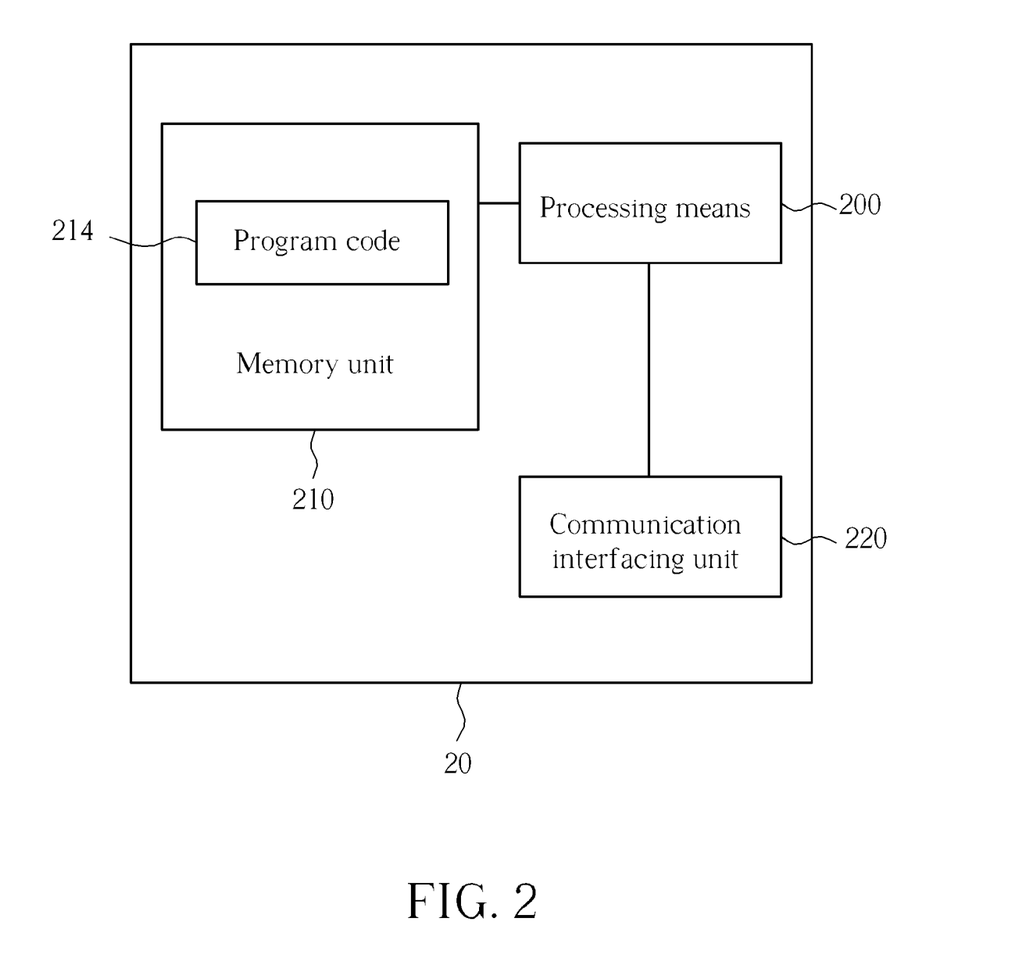
FIG. 2 is a schematic diagram of an exemplary communication device according to the present invention.

Please refer to FIG. 2, which is a schematic diagram of a communication device 20 according to an example of the present invention. The communication device 20 can be the UE or the network shown in FIG. 1, but is not limited herein. The communication device 20 may include a processor 200 such as a microprocessor or an Application Specific Integrated Circuit (ASIC), a storage unit 210 and a communication interfacing unit 220. The storage unit 210 may be any data storage device that can store a program code 214, accessed by the processor 200. Examples of the storage unit 210 include but are not limited to a subscriber identity module (SIM), read-only memory (ROM), flash memory, random-access memory (RAM), CD-ROM/DVD-ROM, magnetic tape, hard disk, and optical data storage device. The communication interfacing unit 220 is preferably a radio transceiver and can exchange wireless signals with the network according to processing results of the processor 200.

Figure 3:
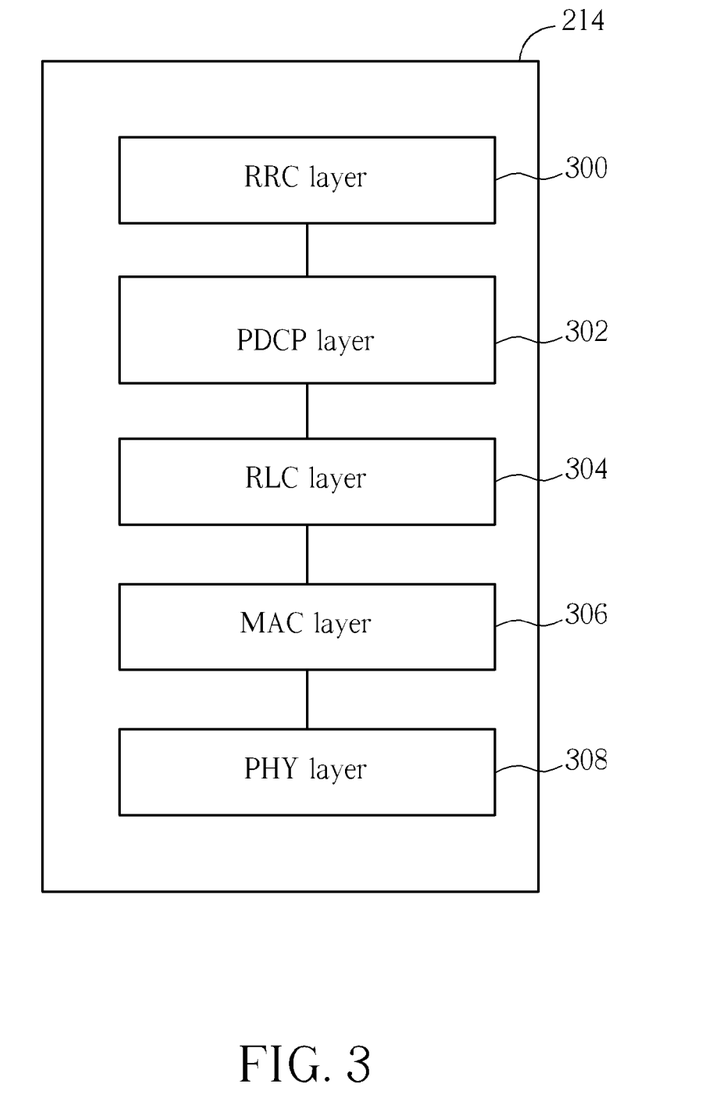
FIG. 3 is a schematic diagram of communication protocol layers for an exemplary wireless communication system.

Please refer to FIG. 3, which illustrates a schematic diagram of communication protocol layers for the wireless communication system 10. The behaviors of some of the protocol layers may be defined in the program code 214 and executed by the processing means 200. The protocol layers from top to bottom are a radio resource control (RRC) layer 300, a packet data convergence protocol (PDCP) layer 302, a radio link control (RLC) layer 304, a medium access control (MAC) layer 306 and a physical (PHY) layer 308. The RRC layer 300 is used for performing broadcast, paging, RRC connection management, measurement reporting and control and radio bearer control responsible for generating or releasing radio bearers. The PDCP layer 302 is used for ciphering and integrity protection of transmissions, and maintaining delivery order during a handover. The RLC layer 304 is used for segmentation/concatenation of packets and maintaining delivery sequence when packet loses. The MAC layer 306 is responsible for a hybrid automatic repeat request (HARQ) process, multiplexing logical channels, a random access channel (RACH) procedure and maintaining a UL timing alignment. In each HARQ process, an acknowledgement (ACK) is reported to the network if the MAC data/control packet is received and decoded successfully. Otherwise, a negative acknowledgement (NACK) is reported to the network. The PHY layer 308 is used to provide physical channels. FIG. 3 simply illustrates the behaviors of the protocol layers conceptually, and the behaviors may be different for the LTE system and the UMTS system. For example, the PDCP layer 302 is not used for transmissions of RRC messages in the UMTS system. The PHY layer 308 in the UMTS system may use code division multiple access (CDMA) technology or time division multiple access (TDMA), but the LTE system uses orthogonal frequency-division multiple access (OFDMA)/orthogonal frequency-division multiplexing (OFDM) technologies.

Figure 4:
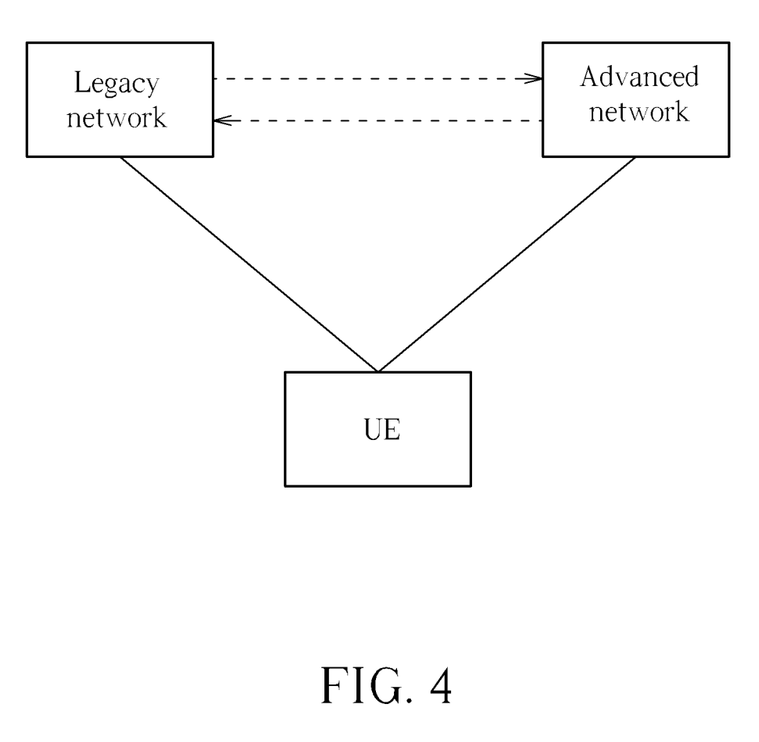
FIG. 4 is a schematic diagram of an inter-RAT handover according to an example of the present invention

Please refer to FIG. 4, which is a schematic diagram of an inter-RAT (radio access technology) handover according to an example of the present invention. In FIG. 4, a UE is handed over between a legacy network of the UMTS or the LTE system shown in FIG. 1, and an advanced network of the LTE-A system shown in FIG. 1. In other words, the advanced network supports the CA and can allocate multiple cells (e.g. multiple component carriers) to the UE, and the legacy network does not.

Figure 5:
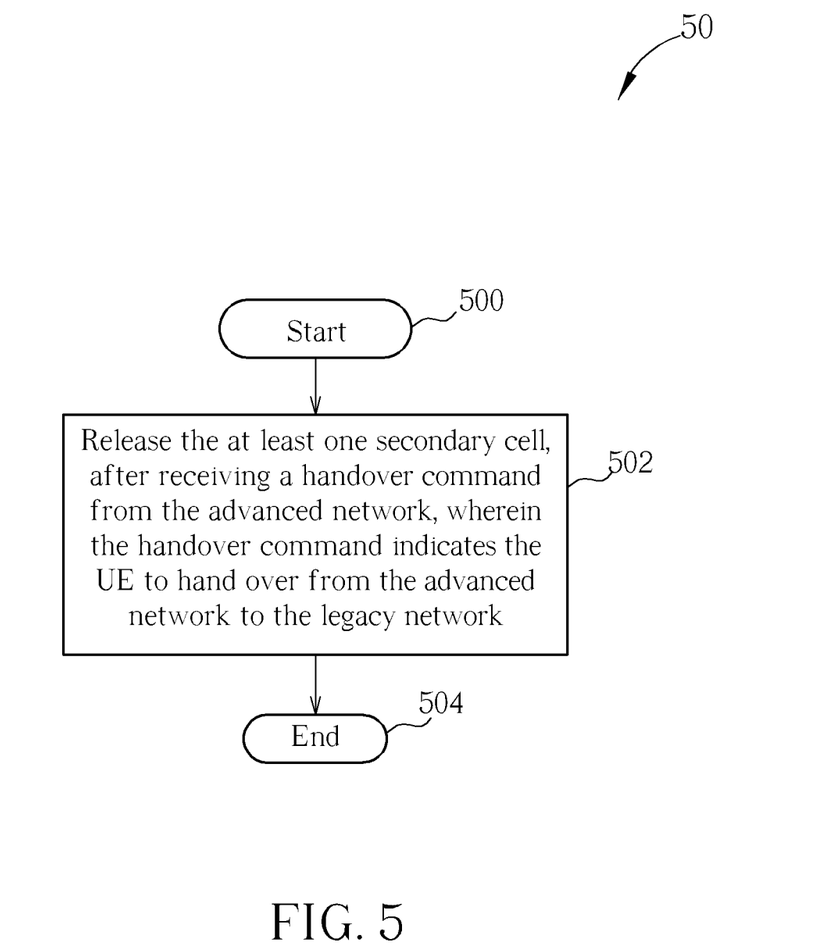
FIG. 5 is a flowchart of an exemplary process according to the present invention.

Please refer to FIG. 5, which is a flowchart of a process 50 according to an example of the present invention. The process 50 is utilized in the UE shown in FIG. 4, to handle at least one secondary cell of the UE, when the UE is handed over from the advanced network to the legacy network. The process 50 may be compiled into the program code 214 and includes the following steps:

Step 500: Start.

Step 502: Release the at least one secondary cell, after receiving a handover command from the advanced network, wherein the handover command indicates the UE to hand over from the advanced network to the legacy network.

Step 504: End.

When the UE moves from a coverage of the advanced network to a coverage of the legacy network, an inter-RAT handover happens. In this situation, the advanced network transmits a handover command for indicating the UE to hand over from the advanced network to the legacy network, and the UE release the at least one secondary cell according to the process 50. Further, the legacy network conforms to a 3GPP standard with a version equal to or earlier than the 3GPP Rel-9, and the advanced network conforms to the 3GPP standard with a version equal to or later than the 3GPP Rel-10. Therefore, it is not necessary for the UE to waste power on waiting transmissions on the at least one secondary cell, since the legacy network does not support the CA. The power can be saved according to the process 50.

Preferably, the handover command is a RRCConnection-Reconfiguration message comprising a full configuration (e.g. mobilityControlInfo) indicator (e.g. fullConfig) defined in the 3GPP standard, for indicating the full configuration is applicable for the RRCConnectionReconfiguration message, and is not limited herein.

Therefore, according to the above illustration and the process 50, when the UE is handed over from the advanced network to the legacy network, the UE release the at least one secondary cell which are not supported by the legacy network. The power on waiting transmissions on the at least one secondary cell can be saved.

Figure 6:
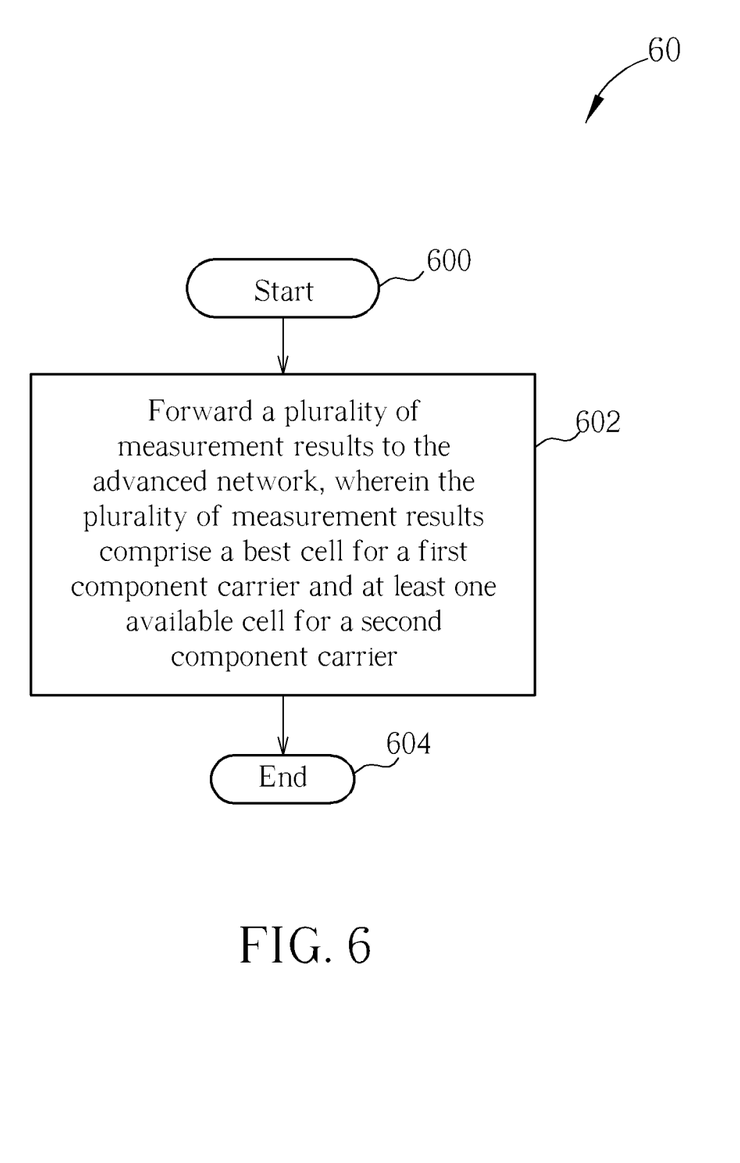
FIG. 6 is a flowchart of an exemplary process according to the present invention.

Please refer to FIG. 6, which is a flowchart of a process 60 according to an example of the present invention. The process 60 is utilized in the legacy network shown in FIG. 4, for handling an inter-RAT handover, when the UE is handed over from the legacy network to the advanced network. The process 60 may be compiled into the program code 214 and includes the following steps:

Step 600: Start.

Step 602: Forward a plurality of measurement results to the advanced network, wherein the plurality of measurement results comprise a best cell for a first component carrier and at least one available cell for a second component carrier.

Step 604: End.

When the UE moves from a coverage of the legacy network to a coverage of the advanced network, the inter-RAT handover happens. According to the process 60, the legacy network forwards the plurality of measurement results comprising a best cell for a first component carrier and at least one available cell for a second component carrier to the advanced network. Preferably, the best cell is used for a primary cell, and the at least one available cells is used for at least one secondary cell. Therefore, not only the advanced network can continue the inter-RAT handover, but the advanced network can allocate the primary cell and the at least one secondary cell, i.e., multiple cells (e.g. multiple component carriers), to the UE immediately according to the plurality of measurement results. Therefore, the UE doest not need another procedure for being allocated the multiple cells, but can receive services via the multiple cells right after the inter-RAT handover is completed.

Preferably, the legacy network may transmit a handover preparation message comprising the plurality of measurement results to the advanced network, to trigger the inter-RAT handover. Further, after the advanced network determines the primary cell and the at least one secondary cell for the UE, the advanced network generates a handover command comprising a primary cell configuration for the primary cell and at least one secondary cell configuration for the at least one secondary cell. The handover command is then transmitted to the legacy network, and is then forwarded to the UE by the legacy network. Therefore, the UE can receive the services via the primary cell and the at least one secondary cell according to the primary cell configuration and the at least one secondary cell configuration, respectively.

Please note that, the legacy network conforms to a 3GPP standard with a version equal to or earlier than the 3GPP Rel-9, and the advanced network conforms to the 3GPP standard with a version equal to or later than the 3GPP Rel-10. Preferably, the handover command is a RRCConnectionReconfiguration message defined in the 3GPP standard, for indicating the UE that the inter-RAT handover happens, and is not limited herein.

Therefore, according to the above illustration and the process 60, when the UE is handed over from the legacy network to the advanced network, the UE can receive the services via the multiple cells right after the inter-RAT handover is completed. Additional procedure for configuring the multiple cells to the UE is not needed, and a delay and resources for the additional procedure are saved.

Please note that, the abovementioned steps of the processes including suggested steps can be realized by means that could be a hardware, a firmware known as a combination of a hardware device and computer instructions and data that reside as read-only software on the hardware device, or an electronic system. Examples of hardware can include analog, digital and mixed circuits known as microcircuit, microchip, or silicon chip. Examples of the electronic system can include a system on chip (SOC), system in package (SiP), a computer on module (COM), and the communication device 20.

In conclusion, the present invention provides methods for configuring multiple cells to a UE when an inter-RAT handover happens. According to the present invention, the UE can save power on waiting transmissions on at least one secondary cell when the UE is handed over from an advanced network to a legacy network. Besides, the UE can receive services via the multiple cells right after the UE is handed over from the legacy network to the advanced network. A delay and resources for additional procedure configuring the multiple cells to the UE are saved.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A method of handling at least one secondary cell of a mobile device in a wireless communication system, the mobile device being managed by a first network of the wireless communication system, the method comprising:

releasing all secondary cells including associated uplink and downlink component carriers of the mobile device, after receiving a handover command from the first network, wherein the handover command indicates the mobile device to hand over from the first network to a second network of the wireless communication system;

wherein the second network conforms to a 3rd Generation Partnership Project (3GPP) standard with a version equal to or earlier than the 3GPP Release 9 such that the second network does not support any uplink or downlink secondary component carriers for the mobile device, and the first network conforms to the 3GPP standard with a version equal to or later than the 3GPP Release 10;

wherein the handover command is a RRCConnectionReconfiguration message comprising a full configuration indicator.

2. A method of handling an inter-RAT (radio access technology) handover of a first network of a wireless communication system, for handling the inter-RAT handover from the first network to a second network of the wireless communication system, the method comprising:

forwarding a plurality of measurement results to the second network, wherein the plurality of measurement results comprise a best cell for a first component carrier and at least one available cell for a second component carrier;

generating, by the second network, a handover command according to the plurality of measurement results;

wherein the handover command is a RRCConnectionReconfiguration message comprising a primary cell configuration for the first component carrier and at least one secondary cell configuration for the second component carrier;

wherein the first network conforms to a 3rd Generation Partnership Project (3GPP) standard with a version equal to or earlier than the 3GPP Release 9 such that the first network does not support any uplink or downlink secondary component carriers for a mobile device, and the second network conforms to the 3GPP standard with a version equal to or later than the 3GPP Release 10.

3. The method of claim 2, wherein forwarding the plurality of measurement results to the second network comprises:

forwarding a handover preparation message comprising the plurality of measurement results to the second network.

* * * * *